UNITED STATES PATENT OFFICE.

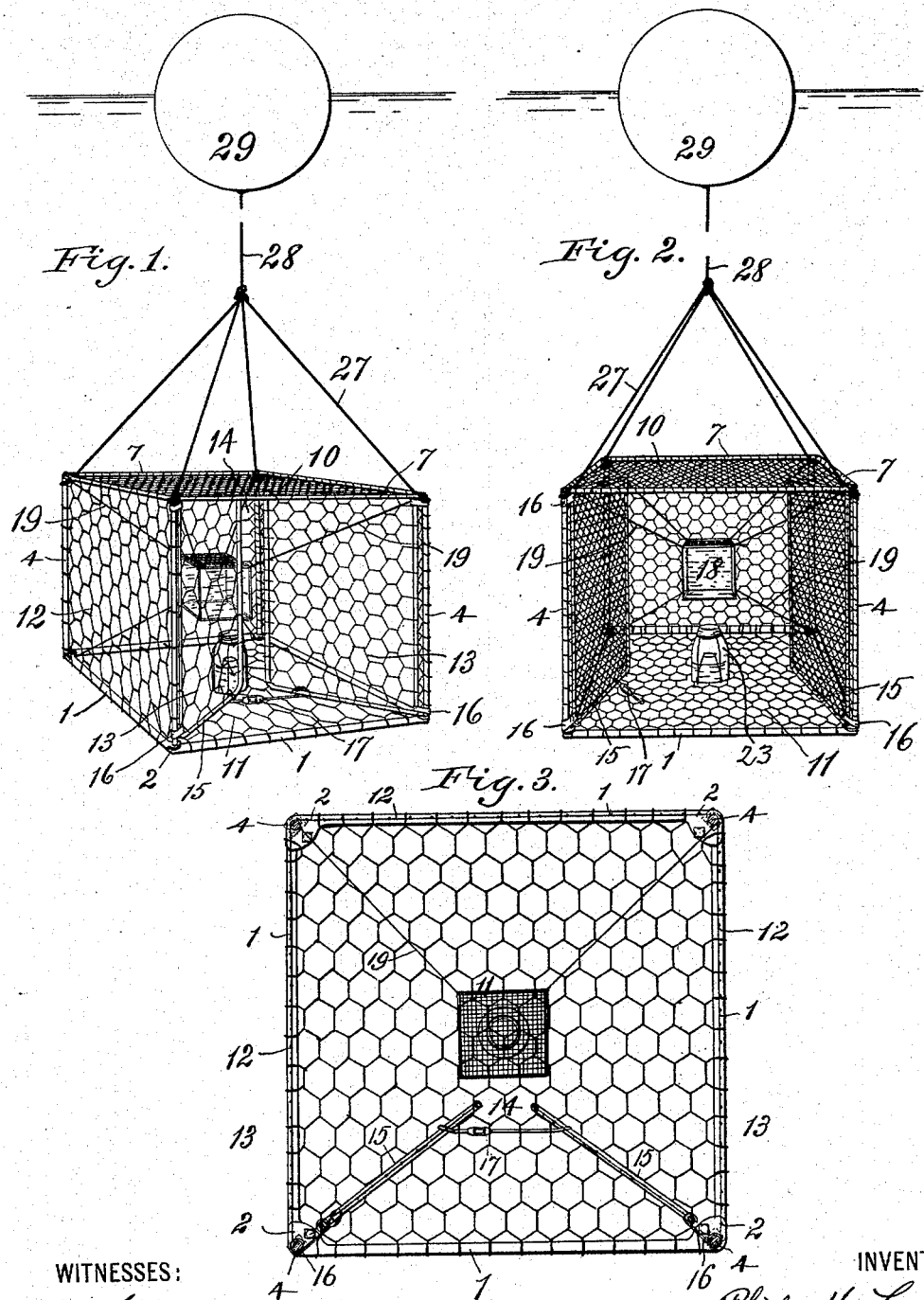

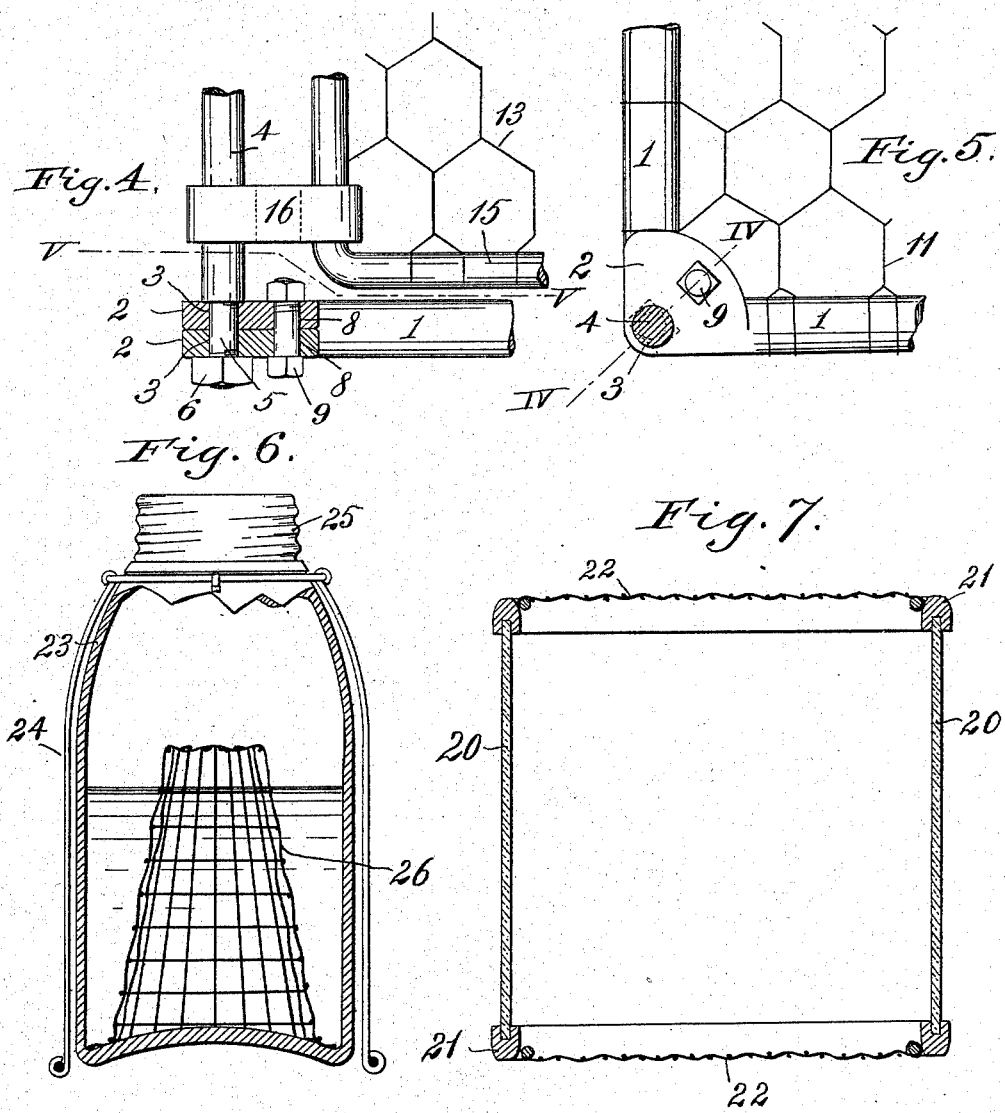

PHILOLOGOUS H. LOUD, JR., OF CHARLESTON, SOUTH CAROLINA.

FISH-TRAP.

SPECIFICATION forming part of Letters Patent No. 527,435, dated October 16, 1894.

Application filed June 30, 1894. Serial No. 516,239. (No model.)

*To all whom it may concern:*

Be it known that I, PHILOLOGOUS H. LOUD, Jr., a citizen of the United States of America, residing at the city of Charleston, Charleston county, State of South Carolina, have invented certain new and useful Improvements in Traps for Sea-Bass, &c., of which the following is a specification.

My invention has for its object an improved means for catching sea bass or other sea or fresh water fish, the same being in the nature of a trap adapted to be lowered or set upon the bottom, or below the surface of the water in which it is used.

My invention aims especially to furnish a device of this character which is economical and durable of construction, which may be conveniently used, set and removed, and which will be efficient for the purpose.

To this end my improvement consists in a trap formed principally or entirely of wire or other netting of large mesh mounted upon a frame in such manner that currents of water may pass freely through it, the trap being provided upon one or more sides with an opening or openings having converging walls adapted to direct the fish toward a slit or opening at the inner end of said walls, and provided further, within the trap, with bait-holding devices of such character that minnows, small crabs, or other live bait may be confined and protected and at the same time displayed so as to be readily seen from the exterior of the trap and attract the fish. The said frame is furthermore preferably constructed so that it may be readily folded for the purpose of handling and transporting what would otherwise be a very bulky device.

In order to make my invention more clearly understood, I have shown in the accompanying drawings means for carrying the same into practical effect, without limiting my improvements in their useful applications, to the particular construction which, for the sake of illustration, I have delineated.

In said drawings:—Figure 1 is a perspective view of a fish trap embodying my invention, the same being shown with its parts in position for use. Fig. 2 is a perspective view of the same open for baiting it or for removing the catch. Fig. 3 is a horizontal sectional view of the trap. Figs. 4 and 5 are respectively vertical and horizontal sectional views, showing the construction of the corners of the trap frames. Figs. 6 and 7 are vertical sectional views of the bait receptacles.

Referring to the drawings, 1 indicates the side pieces of the horizontal bottom frame of the trap. These are preferably made of wrought iron and heavier than the upper frame pieces so as to give stability to the device and prevent it from being accidentally overturned by currents or otherwise. Each of the pieces 1 is preferably formed at each end with a quadrant 2 situated horizontally so that the quadrants at the meeting ends of said frame pieces may lie flat one upon the other.

3 indicates a perforation in each quadrant near its angle, through which perforations are adapted to be passed the lower ends of the vertical frame pieces 4. When thus inserted it will be observed that the pieces 4 serve as hinge-pins upon which the frame pieces 1 may be turned, to bring the trap into its folded position. For the purpose of holding the pieces 4 in the perforations 3 they may be provided with screw-threaded ends 5 of reduced diameter which pass through the perforations 3 and upon the lower ends of which are screwed nuts 6.

7 indicates the horizontal frame pieces of the top of the trap, which pieces are preferably provided with quadrants 2 and perforations 3 similar to those already described in connection with the bottom frame. The upper ends of the pieces 4 are united with the top frame in the manner already described.

In order to give rigidity to the frame of the trap the quadrants 2 are provided with eccentric perforations 8 through which may be passed short bolts 9, thus preventing any turning of the horizontal upon the vertical frame pieces. When the trap is to be folded up the bolts 9 are removed.

10 and 11 indicate top and bottom panels preferably of web wire netting which will offer little or no obstruction to the passage of water in raising or lowering the trap. These panels are united with the frame pieces 7 and 1 in any convenient manner, and are preferably removed, or partly removed or slackened when the trap is to be folded. 12 indicates the permanent vertical or side panels of the trap, their vertical edges being secured to the upright pieces 4 and their top and bottom edges to the frame pieces 7 and 1.

In place of one or more of the panels 12, which latter are also made of web wire netting of comparatively large mesh which will offer little obstruction to currents of water and which will permit the interior of the trap and the bait to be readily observed from the exterior, I substitute inwardly inclined panels 13, at the inner ends of which is left the opening 14, Fig. 1, through which access is obtained to the interior of the device when the trap is set. In the drawings I have illustrated this entrance as formed with but two panels, consisting of wire netting mounted upon frames 15, the outer vertical edges of which latter are hinged to the uprights 4 by metallic straps or loops 16, and the upper and lower edges of which are in close proximity to the inner faces of the top and bottom panels 10 and 11; but I do not confine myself to forming the entrance of the trap by the precise form or number of inclined panels illustrated.

In order to adjust the size of the opening or slit 14 to the fish for which the trap is to be set, I connect the frames 15 by one or more turn-buckles 17, by the operation of which the inner edges of the panels 13 may be brought nearer to or farther from each other, and which may be entirely disconnected as shown in Fig. 2 to give free access to the interior of the trap.

The bait should be displayed opposite to the slit or opening 14, and the means for holding it must be such that it can be kept alive and so as to be readily observed by the fish from the exterior of the trap. To this end I provide a box or receptacle 18, which is preferably suspended at or near the middle of the trap by wires 19 which are connected with the top and bottom of the trap. The receptacle 18 is preferably made with vertical panels 20 of glass, held in a suitable frame 21, which will give a perfect view of the interior of the bait box, and with top and bottom panels of close woven wire netting, which will confine the minnows or small crabs or other bait and will permit a free circulation of water through the bait box, for keeping the bait alive. The said wire panels are indicated by 22. It will, however, be understood that the walls of the bait receptacle may be made entirely of glass or of wire, without departing from my invention.

23 is a supplemental bait receptacle, which may be used with or in place of the receptacle 18. It consists of a glass jar held in a supporting frame of wire 24, the lower portion of which latter is attached to the bottom 11 of the trap. Said jar has a cover 25 by which it may be sealed.

26 is a wire cone or other suitable support within the jar 23. In baiting the trap this latter receptacle is partly filled with water above which the top of the cone 26 will project, and a number of small crabs or other bait are placed within the jar. When the trap is set the playing of the bait within the jar and on the cone 26 serves as an attraction for the fish to be caught.

27 indicates wire or other cords connected with the top corners of the trap and united to a central hoisting line 28. At the upper end of the latter is attached a buoy 29 which marks the place where the trap has been set. Said buoy may be of sufficient size to suspend the trap in the water above the bottom.

When the trap is set the fish will find a ready entrance, when attracted by the bait which will seem to be within easy reach, and unprotected, through the slit or opening 14, but in most cases it will be impossible for them to find the exit from the interior of the trap.

What I claim is—

1. A fish trap composed of foraminated material, having the inwardly inclined hinged panels 15, means for adjusting the opening between the inner ends of said panels, and a bait receptacle within the trap, substantially as set forth.

2. A fish trap composed of foraminated material, having a suitable entrance opening, and within the trap the live or other bait receptacle 18 provided with transparent vertical walls and top and bottom panels of wire netting or equivalent open work, substantially as set forth.

3. A fish trap composed of wire netting or similar material, having a suitable entrance opening, the bait receptacle 18, and the jar 23 containing the cone or support 26 for the bait, substantially as set forth.

4. A fish trap consisting of a bottom frame of separate pieces having pivot apertures 3, a top frame composed of similar pieces, uprights 4 uniting and serving as pivots for said top and bottom pieces, and top, bottom and side panels of foraminated material supported on said pieces, substantially as set forth.

5. The combination of the top and bottom pieces 1 and 7 provided with quadrants 2 having perforations 3 and 8, uprights 4 passing through said perforations 3, bolts 9 engaging the perforations 8, and panels of foraminated material supported on said pieces and uprights, substantially as set forth.

In witness whereof I have hereunto signed my name in the presence of two witnesses.

PHILOLOGOUS H. LOUD, JR.

Witnesses:
T. W. BACOT,
EDWARD McCRADY.